US008648535B2

(12) United States Patent
Tatara

(10) Patent No.: US 8,648,535 B2
(45) Date of Patent: Feb. 11, 2014

(54) VEHICLE LAMP CONTROL APPARATUS

(75) Inventor: Naohisa Tatara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 42 days.

(21) Appl. No.: 13/462,215

(22) Filed: May 2, 2012

(65) Prior Publication Data

US 2012/0306368 A1  Dec. 6, 2012

(30) Foreign Application Priority Data

May 31, 2011 (JP) ................................ 2011-121139
Feb. 20, 2012 (JP) ................................ 2012-033528

(51) Int. Cl.
*B60Q 1/00* (2006.01)
*B60Q 1/42* (2006.01)
*B60Q 1/34* (2006.01)

(52) U.S. Cl.
USPC ............................. 315/81; 362/466; 362/512

(58) Field of Classification Search
USPC ............... 315/80, 81, 291; 362/464–466, 512
See application file for complete search history.

(56) References Cited

U.S. PATENT DOCUMENTS

| 5,588,733 | A   | 12/1996 | Gotou |
| 6,481,876 | B2* | 11/2002 | Hayami et al. ................ 362/464 |
| 6,805,472 | B2* | 10/2004 | Fukawa ........................ 362/466 |
| 7,210,828 | B2* | 5/2007  | Fukawa et ..................... 362/465 |
| 7,699,509 | B2* | 4/2010  | Leleve ......................... 362/464 |
| 7,896,512 | B2* | 3/2011  | Tatara et al. .................... 362/43 |
| 2001/0012206 | A1 | 8/2001 | Hayami et al. |
| 2003/0031008 | A1 | 2/2003 | Kobayashi |
| 2004/0114379 | A1 | 6/2004 | Miller et al. |
| 2008/0084286 | A1 | 4/2008 | Teramura et al. |

FOREIGN PATENT DOCUMENTS

GB  2 358 914 A   8/2001
JP  2001213227 A  8/2001

OTHER PUBLICATIONS

Search Report dated Dec. 9, 2013 issued by the European Patent Office in counterpart European Patent Application No. 12167475.8.

* cited by examiner

*Primary Examiner* — Don Le
(74) *Attorney, Agent, or Firm* — Sughrue Mion, PLLC

(57) ABSTRACT

In a vehicle lamp control apparatus, a control unit controls sub lamps in a first condition based on a main information signal including a turn signal or a steering angle signal, and in a second condition based on a sub information signal. A noticeability of the second condition is lower than a noticeability of the first condition.

7 Claims, 12 Drawing Sheets

FIRST LIGHT QUANTITY AND FIRST TIMING

SECOND LIGHT QUANTITY AND SECOND TIMING

VEHICLE LAMP CONTROL APPARATUS

BACKGROUND OF THE INVENTION

1. Field of the Invention

The present invention relates to a lamp control apparatus which includes a main lamp such as a headlamp and a sub lamp which illuminates different areas from the main lamp respectively provided on a vehicle such as an automobile and is used to control a turn-on condition of the sub lamp in order to secure a safety of own vehicle, other vehicles and pedestrians.

2. Related Art

In a vehicle including, in addition to headlamps for illuminating a traveling direction of own vehicle, cornering lamps and bending lamps for illuminating different areas from the head lamps, a so called lamp control apparatus is mounted so as to control a turn-on, turn-off, light distribution, illumination direction and the like of these lamps. For example, JP-A-2001-213227 discloses a lighting system of a vehicle including multiple lamps respectively disposed on right and left sides of a front portion of the vehicle and having illumination directions different from each other. The multiple lamps include headlamps as main lamps, rain lamps for illuminating areas existing on slightly rightward or leftward areas of areas of the headlamps, and bending lamps for illuminating areas just ahead of right or left side of the vehicle. According to the system, the sub lamps are turned on and turn-on condition especially, light quantities of the sub lamps are controlled, when the own vehicle changes its traveling direction to right or left, thereby being able to increase the light radiation quantity in the traveling direction so as to secure a safety of the own vehicle. In addition, according to the system, the light quantity of the sub lamps is controlled based on a steering angle detected by a steering sensor, a vehicle speed detected by a vehicle speed sensor and/or an on/off condition of a turn signal lamp switch.

According to the system of JP-A-2001-213227, a control of the sub lamps is carried out based on signals from the steering sensor or turn signal lamp switch. Since these signals are generated in response to an operation of a driver, a sub lamp existing in the traveling direction of the own vehicle can be surely turned on. However, the system is based on a concept in which the sub lamps are controlled only when the traveling direction is changed. Therefore, according to the system, for example, when the own vehicle goes straight through an intersection, there occurs a state where the sub lamps are not turned on and illuminations of the right and left areas of the own vehicle may not be sufficient. This may make it difficult to confirm a bicycle and a pedestrian existing on the right and left of the own vehicle and, therefore, the safety of such bicycle and pedestrian may not be secured.

To solve this problem, it can be considered that the sub lamps are controlled by estimating a change of the traveling direction of the own vehicle based on to a vehicle speed signal from a vehicle speed sensor, a road information signal from a navigation apparatus, a vehicle front area information signal, a signal about a face direction of the driver from an imaging apparatus, or other similar signals. According to this configuration, for example, even when the own vehicle goes straight, the sub lamps can be turned on in response to a right and left confirmation of the driver. Therefore, this configuration may be effective in securing the safety. However, since these signals are not directly based on driver's operations in response to the change of the traveling direction so that a correlation between these signals and the traveling direction of the vehicle is not always high and thus these signals can be said to be uncertain information. Therefore, when the sub lamps are controlled according to such uncertain information, there is a fear that the driver of the own vehicle, a driver of other vehicles, and pedestrians may be confused. For example, if the right and left sub lamps are brightly turned on with a predetermined light quantity based on the face direction signal of the driver even when the own vehicle goes straight, areas other than the traveling direction are brightly illuminated so that the driver may feel strange. If a driver of other vehicle or the pedestrian found that the sub lamps are brightly turned on, said other vehicle's driver or the pedestrian may misunderstand that the vehicle will change the traveling direction to right or left and said other vehicle's driver or the pedestrian may take faulty reactions so that the safety may be rather lowered. Especially, if the light quantities of the sub lamps are about the same as light quantities of the main lamps or if the sub lamps and the main lamps are turned on at the same time, an attention level of the said other vehicle's driver or the pedestrian to the sub lamps is increased and a risk of the above problem would be improved.

SUMMARY OF THE INVENTION

One or more embodiments relates to a vehicle lamp control apparatus which can secure a safety of an own vehicle and can prevent useless confusion of other vehicle's driver or a pedestrian due to sub lamps which are turned on, by appropriately controlling the sub lamps.

DETAILED DESCRIPTION OF THE EMBODIMENTS

Embodiments are described with reference to the accompanying drawing. The embodiments described herein are not intended to limit the invention but only as examples of the invention, and all features or combinations of the features of the embodiments are not always essential to the invention.

Figure 1:
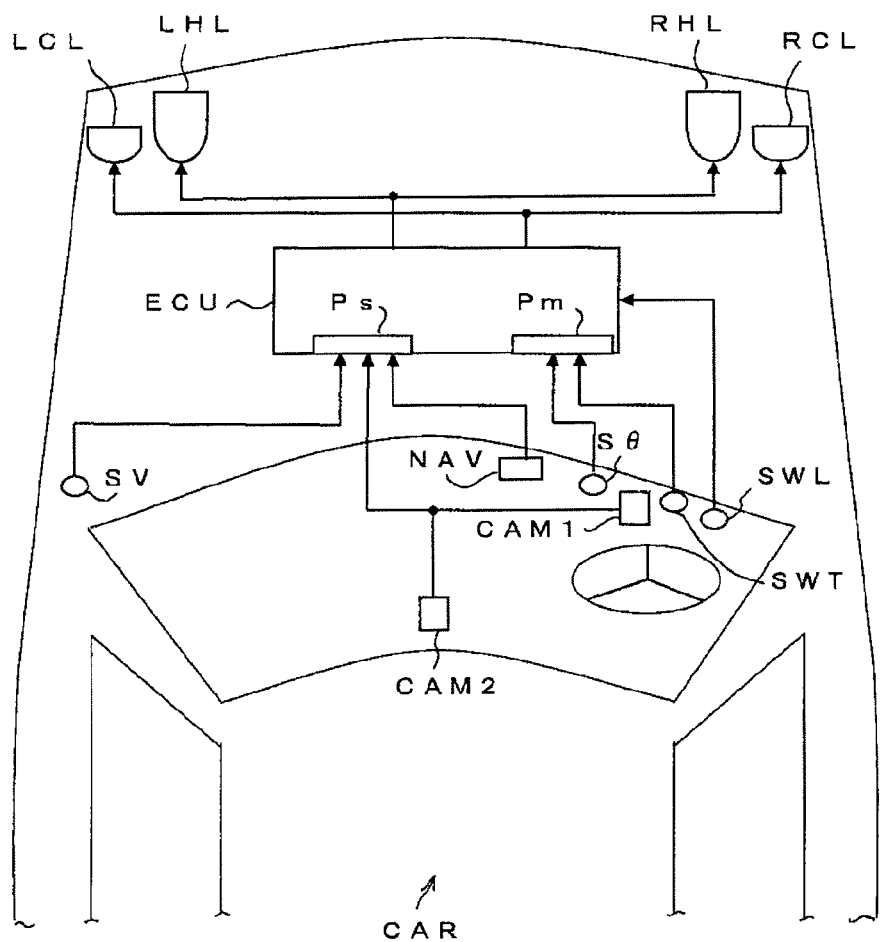
FIG. 1 is a schematic structure view of a lamp control apparatus according to embodiments.
Figure 2:
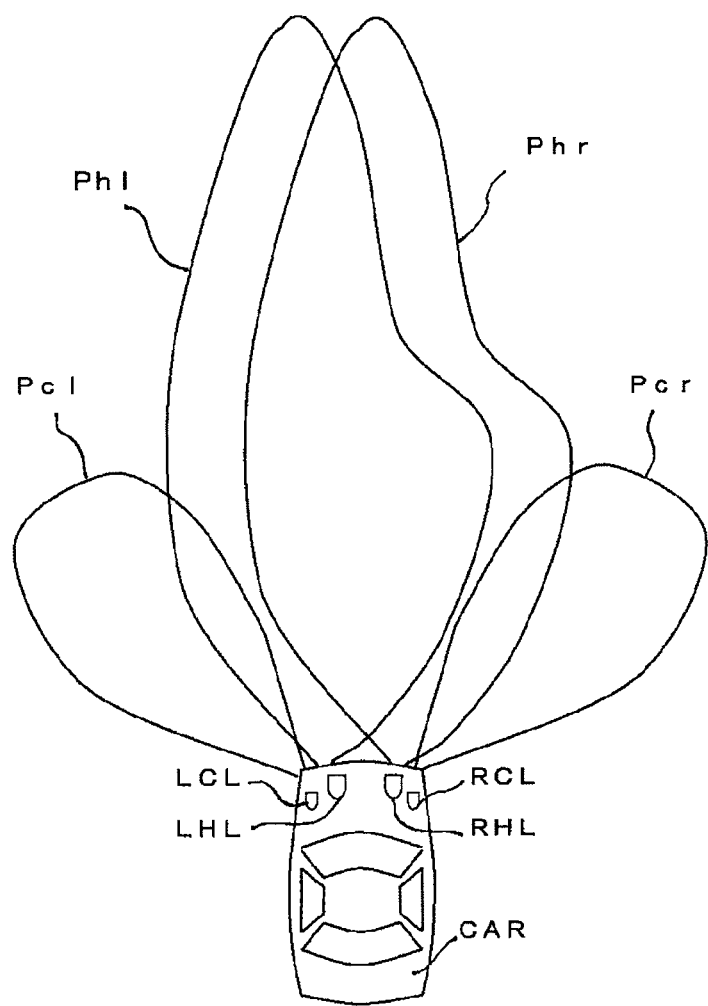
FIG. 2 is a view of the light distributions of headlamps and cornering lamps.

FIG. 1 is a conceptual structure view in which embodiments are applied to a vehicle. On the forward left and right sides of a vehicle CAR, as main lamps, there are provided a left headlamp LHL and a right headlamp RHL respectively. These headlamps can be turned on in response to a turn-on signal and thus, as shown in FIG. 2, they can illuminate an area ahead of the own vehicle according to light distribution patterns Phl and Phr. Also, in positions adjacent to the headlamps LHL and RHL in the front portion of the vehicle CAR, there are provided a left cornering lamp LCL and a right cornering lamp RCL respectively as sub lamps and, when they are turned on, as shown in FIG. 2, they can illuminate areas respectively existing on the more leftward and rightward sides of the light distribution patterns Phl and Phr of the headlamps according to light distribution patterns Pcl and Pcr respectively.

As shown in FIG. 1, the vehicle CAR includes a lamp control unit ECU constituted of an electronic control circuit unit, while this lamp control unit ECU is used to control the headlamps LHL, RHL and cornering lamps LCL, RCL. Also, the vehicle CAR includes a turn-on switch SWL for outputting a turn-on signal for turning on the headlamps LHL and RHL, a steering angle sensor Sθ for outputting a steering angle signal for detecting a steering angle formed by the steering of the vehicle, and a turn signal switch SWT which, when changing the traveling direction of the own vehicle, is turned on to output a turn signal. These turn-on signal, steering angle signal and turn signal are input to the lamp control unit ECU, while the steering angle signal and turn signal constitute a main information signal.

Further, the vehicle CAR includes a vehicle speed sensor SV for detecting the vehicle speed of own vehicle to output a vehicle speed signal, a detection camera CAM which picks up the image of the face of the driver of own vehicle, detects the direction of the driver's eyes based on the imaged picture and outputs a face direction detection signal, and a navigation apparatus NAV for detecting an intersection, a branch line or the like existing ahead in the traveling direction of own vehicle to output a road condition signal. The vehicle speed signal, face direction detection signal and road condition signal are also input to the lamp control unit ECU, while they constitute a sub information signal.

Figure 3:
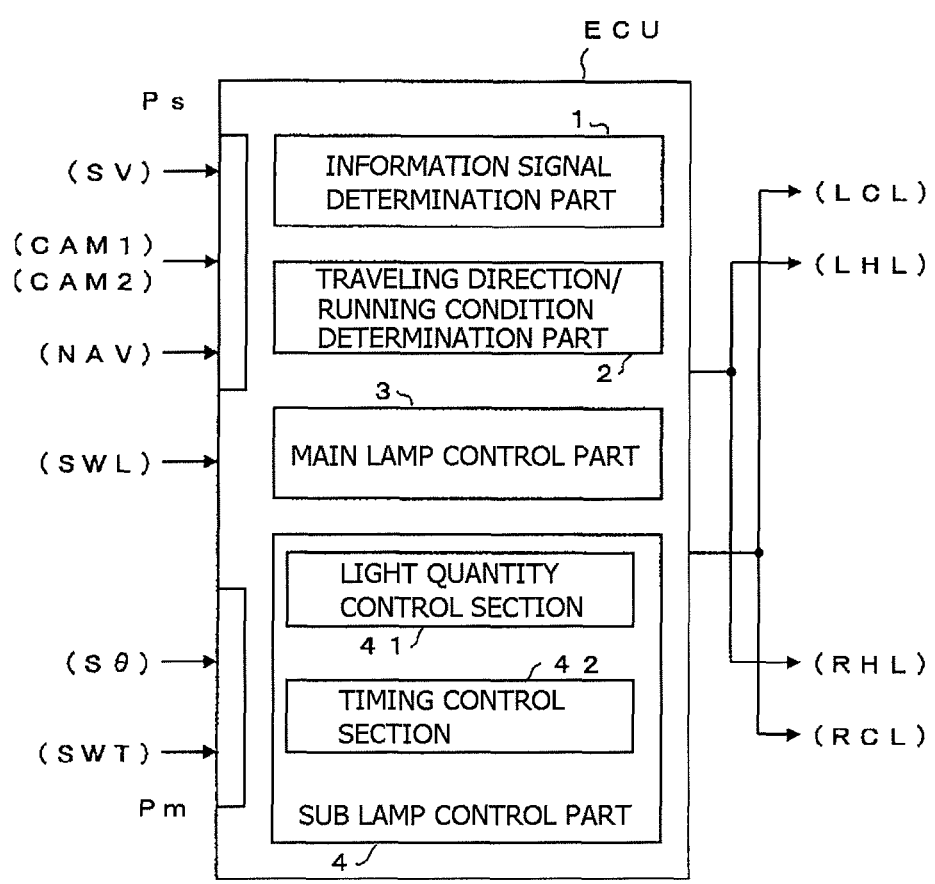
FIG. 3 is a block diagram showing a configuration of the lamp control unit.

As shown in FIG. 3, the lamp control unit ECU includes an information signal determination part 1, a traveling direction/running condition determination part 2, a main lamp control part 3, and a sub lamp control part 4. The information signal determination part 1 is configured to determine whether an information signal input into the lamp control unit ECU is the main information signal or the sub information signal. The main information signal and the sub information signal are respectively input through ports Pm, Ps provided on the lamp control unit ECU through. Thus, the information signal determination part 1 can easy determine whether the input signal corresponds to the main information signal or the sub information signal by determining the port through which the signal is input.

The traveling direction/running condition determination part 2 is configured to execute a required calculation in response to the input main information signal and to determine the traveling direction of the own vehicle based on the calculation. Since the main information signal is obtained based on an operation of the driver corresponding to a change of traveling course, an accuracy of a determination of the traveling direction obtained by the calculation is high. The traveling direction/running condition determination part 2 also determines a running condition of the own vehicle based on the sub information signal. For example, when the own vehicle enters intersections, the vehicle speed is usually reduced. Thus, the traveling direction/running condition determination part 2 determines a running condition in which the own vehicle enters an intersection in response to a detection of a reduction of the vehicle speed. As for the face direction detection signal, the traveling direction/running condition determination part 2 determines the running condition in which the own vehicle enters the intersection in response to a change of a direction of a driver's face corresponding to a right/left confirming action of the driver when the vehicle enters the intersection. As for the road condition signal, a running condition such that there is an intersection on the traveling direction is determined based on the road condition signal obtained from a map information of the navigation apparatus. Based on these determinations of the running condition, the main lamp control part 3 and the sub lamp control part 4 are controlled.

The main lamp control part 3 is configured to turn on and off the headlamps LHL and RHL based on a turn-on signal obtained by an on/off operation of the turn-on switch SWL. The sub lamp control part 4 is configured to control a condition of the cornering lamps LCL and RCL based on the input information signal. As this control of the condition of turning-on/off, according to the embodiments, since a control of a light quantity and a control of a turning-on timing are carried out, the sub lamp control part 4 includes a light quantity control section 41 for controlling the light quantities of the respective cornering lamps LCL and RCL and a timing control section 42 for controlling the turning-on timings of the respective cornering lamps LCL and RCL.

The light quantity control section 41 is configured to control the light quantities of the respective cornering lamps LCL and RCL to either of a first light quantity or a second light quantity which has a lower light quantity (for example 50% of the light quantity of the first light quantity) than the first light quantity, based on the input main information signal and the sub information signal (that is, the determination results of the information signal determination part 1 and the traveling direction/running condition determination part 2).

The timing control section 42 is configured to control the turning-on timing of the respective cornering lamps LCL and RCL based on the input main information signal and the sub information signal (that is, the determination results of the information signal determination part 1 and the traveling direction/running condition determination part 2). The turning-on timing may include a duration from a start of turning on of the lamps to reach a predetermined light quantities (time constant) or a duration from a start of turning off of the lamps to reach a lighting-off, and these timing (durations) are defines as the turning-on timing. That is, the timing control section 42 is configured to control the turning-on timing to either of a first timing in which the turning-on timing is set to a predetermined time period or a second timing which is more redundant than the first timing (that is, a time period to reach a predetermined light quantity during the turning-on or a time period to reach a complete lighting-off during turning-off of the second timing is longer than that of the first timing).

Specific embodiments 1 to 3 are described.

EMBODIMENT 1

Figure 4:
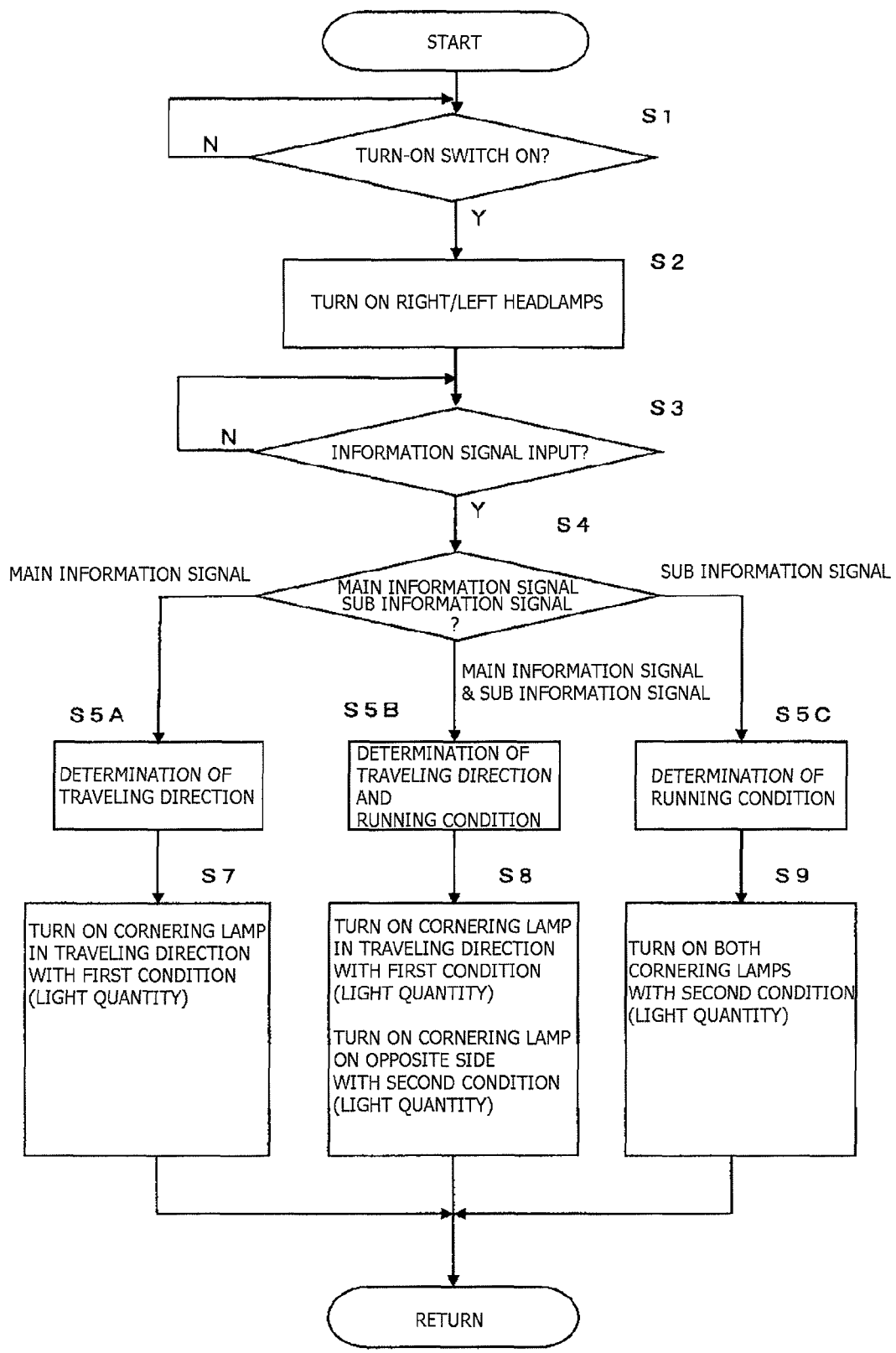
FIG. 4 is a flow chart of a lamp control operation of an embodiment 1.

FIG. 4 is a flow chart of a lamp control of an embodiment 1. According to the embodiment 1, as the control of the first condition and the second condition, the light quantities are controlled. As shown in FIG. 4, when the turn-on switch SWL is turned on and the turn-on signal is input to the lamp control unit ECU (S1), the lamp control unit ECU turns on the headlamps LHL and RHL (S2). Here, the left and right headlamps, as shown in FIG. 2, are respectively turned on according to the light distribution patterns Phl and Phr for illuminating given areas existing ahead of own vehicle with a given light quantity. Then, it is checked whether the information signal is input or not (S3). When it is input, it is checked whether the information signal is any one of the main and sub information signals or is both of them (S4).

Figure 5A:
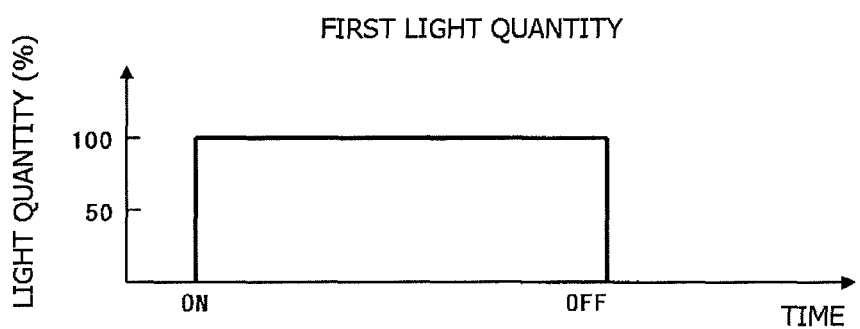
FIG. 5A is a timing chart of a first condition (first light quantity).

When it is determined that the main information signal is input, since a possibility that the own vehicle changes the traveling direction, the traveling direction/running condition determination part 2 determines the traveling direction of the own vehicle based on the main information signal (S5A). After the traveling direction id determined, the light quantity control section 41 of the sub lamp control part 4 turns on one of cornering lamps LCL and RCL at a side of the determined traveling direction in the first condition, that is the first light quantity which is the predetermined light quantity (S7). As shown in FIG. 5A, the first light quantity corresponds to 100% of a preset light quantity. For example, when the main information signal is given from the turn signal lamp switch SWT and is found to change the own vehicle traveling direction to the left, as shown in FIG. 6A, there is obtained the light distribution pattern Pcl according to which the left cornering lamp LCL has been turned on with the first light quantity. In this manner, since the two headlamps LHL and RHL are turned on to obtain the light distribution patterns Phl and Phr for illuminating the area ahead of the own vehicle and also the left cornering lamp LCL existing on the own vehicle traveling direction side is turned on to obtain the light distribution pattern Pcl, the area ahead of the own vehicle and the left area existing in the vehicle traveling direction can be illuminated brightly, thereby being able to secure the safety in the running of own vehicle. Of course, when changing the traveling direction to the right, the right cornering lamp RCL may be similarly turned on with the first light quantity, thereby being able to secure the safety in the right area.

Further, if the input information signal is the steering angle signal from the steering angle sensor Sθ (that is, a different main information signal), the lamp control unit ECU determines the input information signal is the main information signal at the information signal determination part 1 (S4), then the traveling direction is determined at the traveling direction/running condition determination part 2 (S5A), and the light quantity control section 41 of the sub lamp control part 4 turns on the left cornering lamp LCL or the right cornering lamp RCL at a side in the traveling direction based on the determinations. Thus, the left area or right area existing in the traveling direction of the own vehicle can be illuminated brightly, thereby being able to secure the safety in the running of own vehicle. As described, when the information signal input to the lamp control unit ECU is the main information signal, since the possibility of the change of the traveling direction of the own vehicle to the direction shown by the main information signal is high, the cornering lamp existing on the traveling direction side may be turned on with the first light quantity (high light quantity), thereby being able to secure the safety. Further, although the other vehicle, the pedestrian and the like may recognize the turning-on of the cornering lamp, since the area of the traveling direction is illuminated by this turning-on, they can take suitable reaction for securing their safety.

Further, in Step S4, when the information signal determination part 1 determines that the main and sub information signals are both input, that is, when it is found that the main information signal such as the steering angle signal and turn signal and the sub information signal such as the vehicle speed signal, face direction detection signal and road condition signal are input, the traveling direction/running condition determination part 2 determines the traveling direction based on the main information signal and determines the running condition based on the sub information signal at the same time (S5B). Then, based on the determinations of the traveling direction and the running condition, the left and right cornering lamps LCL and RCL are controlled by the light quantity control section 41 of the sub lamp control part 4 (S8). According to this control, the cornering lamp existing in the traveling direction of the own vehicle is turned on with the first light quantity, and, simultaneously, the cornering lamp on the opposite side to the traveling direction is turned on with the second condition (that is the second light quantity) having a lower noticeability than the first condition.

Figure 5B:
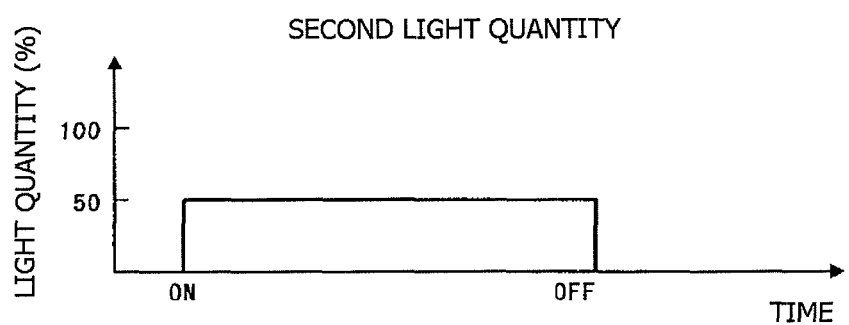
FIG. 5B is a timing chart of a second condition (second light quantity).
Figure 6C:
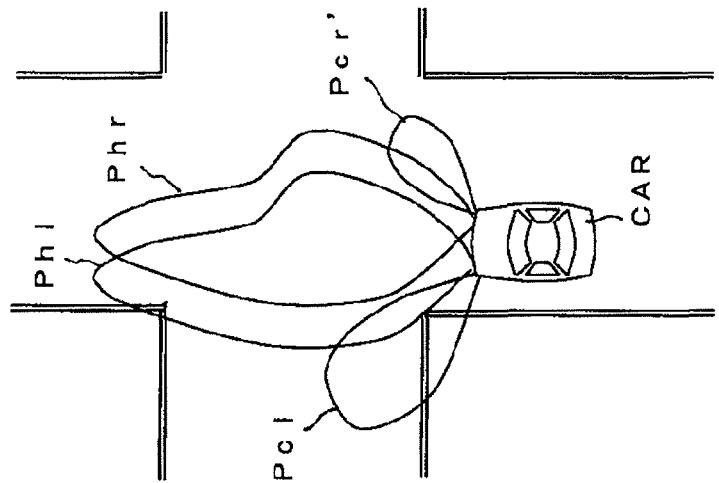
FIGS. 6A to 6C are views of light distributions formed based on different lamp information signals.

For example, as shown in FIG. 6C, when the main information signal and sub information signal are input and the traveling direction/running condition determination part 2 determines that the own vehicle is traveling in the intersection and changing the traveling direction to the left, the left cornering lamp LCL existing in the traveling direction is turned on with the first light quantity (100% of the normal light quantity), based on the determination result, to thereby obtain the light distribution pattern Pcl and, simultaneously, the right cornering lamp RCL existing in the opposite direction to the traveling direction is turned on with the second light quantity (50% of the normal light quantity), as shown in FIG. 5B, to thereby obtain the light distribution pattern Pcr' shown in FIG. 6C. Thereby, it is possible to improve the safety by further brightly illuminating the side of the traveling direction of the own vehicle with the first light quantity. At the same time, it is also possible to ensure the safety by illuminating the opposite side of the traveling direction with the second light quantity. That is, since it is estimated a probability that the own vehicle is traveling in the intersection when the sub information signal is input, it would be preferable to confirm the area of the opposite side of the traveling direction in a view point of the safety. On the other hand, since the noticeability of the right cornering lamp RCL is low, it would be low possibility that the other vehicle, the pedestrian and the like misunderstand that the own vehicle changes the traveling direction to the right even if they see the right cornering lamp RCL, and they would not take a reaction contrary to the safety.

On the other hand, in Step S4, when the information signal determination part 1 determines that the signal input is the sub information signal such as the vehicle speed signal, face direction detection signal or road condition signal, the traveling direction/running condition determination part 2 determines the above described running condition (S5C). At this case, the traveling direction/running condition determination part 2 does not determine the traveling direction, because the accuracy of the determination whether the own vehicle is to go straight or to turn right or left only is low when the determination is only based on the sub information signal. Then, when it is determined that the own vehicle is the running condition in which the own vehicle is running in the intersection, the light quantity control section 41 of the sub lamp control part 4 turns on the left and right cornering lamps LCL and RCL with the second light quantity (that is, the condition which is lower in visibility from the other vehicle, the pedestrian, and the like) which is lower than the first light quantity.

Figure 6B:
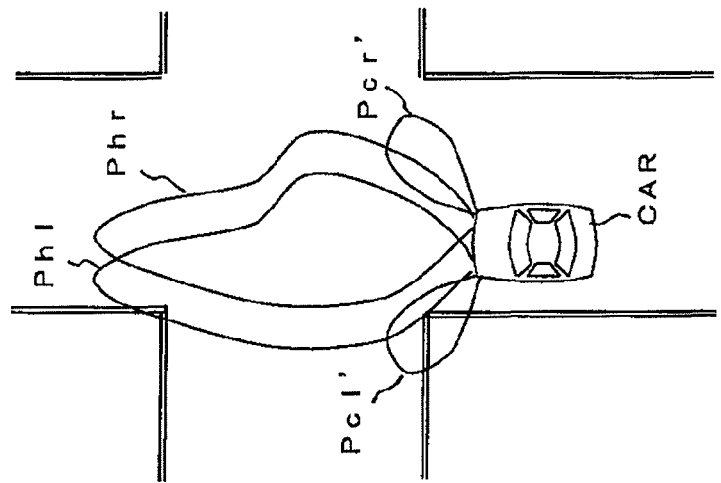
Figure 6A:
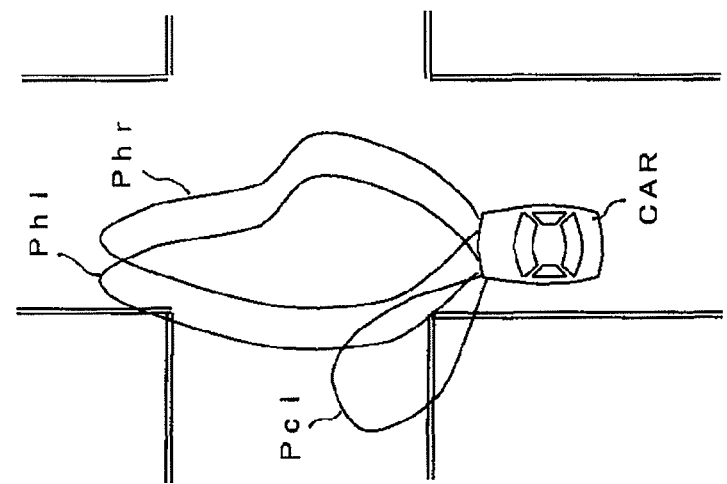

When the information signal is the sub information signal, as shown in FIG. 6B, the left and right cornering lamps LCL and RCL are turned on simultaneously according to light distribution patterns Pcl' and Pcr' in which the light quantity is set for the second light quantity smaller than the first light quantity. Here, as shown in FIG. 5B, the second light quantity is set about 50% of the light quantity when the cornering lamp is turned on based on the main information signal. As described above, since the accuracy of the determination of the traveling direction of the own vehicle based on the sub information signal is not always high and thus the determination can be said to be uncertain information, in the case that the traveling direction is estimated and one of the cornering lamps LCL, RCL is selected for lamp control according to such uncertain information, when such determination is wrong, one of the cornering lamps LCL and RCL existing in a direction different from the traveling direction is turned on, thereby causing the driver of own vehicle to have a strange feeling. However, by turning on the left and right cornering lamps LCL and RCL simultaneously in this manner, the driver can be prevented from suffering from such strange feeling and also can carry out a right/left confirmation action in the intersection. Also, in this case, since the left and right cornering lamps LCL and RCL are turned on with the second light quantity smaller than the normal quantity and their noticeabilities are low, even when other vehicles and pedestrians watch the turn-on of the cornering lamp, there is little possibility that they misunderstand that this vehicle (own vehicle) will change its traveling direction to the left or right and/or take a wrong reaction against their safety.

Moreover, according to the embodiment 1, even if the steering operation or the turn indicating operation by the driver is delayed when the driver changes the traveling direction of the own vehicle, by determining the running condition in the intersection in response to the sub information signal such as the face direction detection signal detecting the right/left confirmation action of the driver and by turning on the left and right cornering lamps LCL and RCL with the second light quantity having a lower light quantity in advance, the safety in the left and right areas can be ensured. Then, by turning on one of the left and right cornering lamps LCL and RCL at a side of the traveling direction with the first light quantity having a higher light quantity based on the main information signal such as the turn signal by the turn indicating operation or the steering angle signal by the steering operation, the area in the traveling direction can be brightly illuminated and the safety can be improved.

Figure 7:
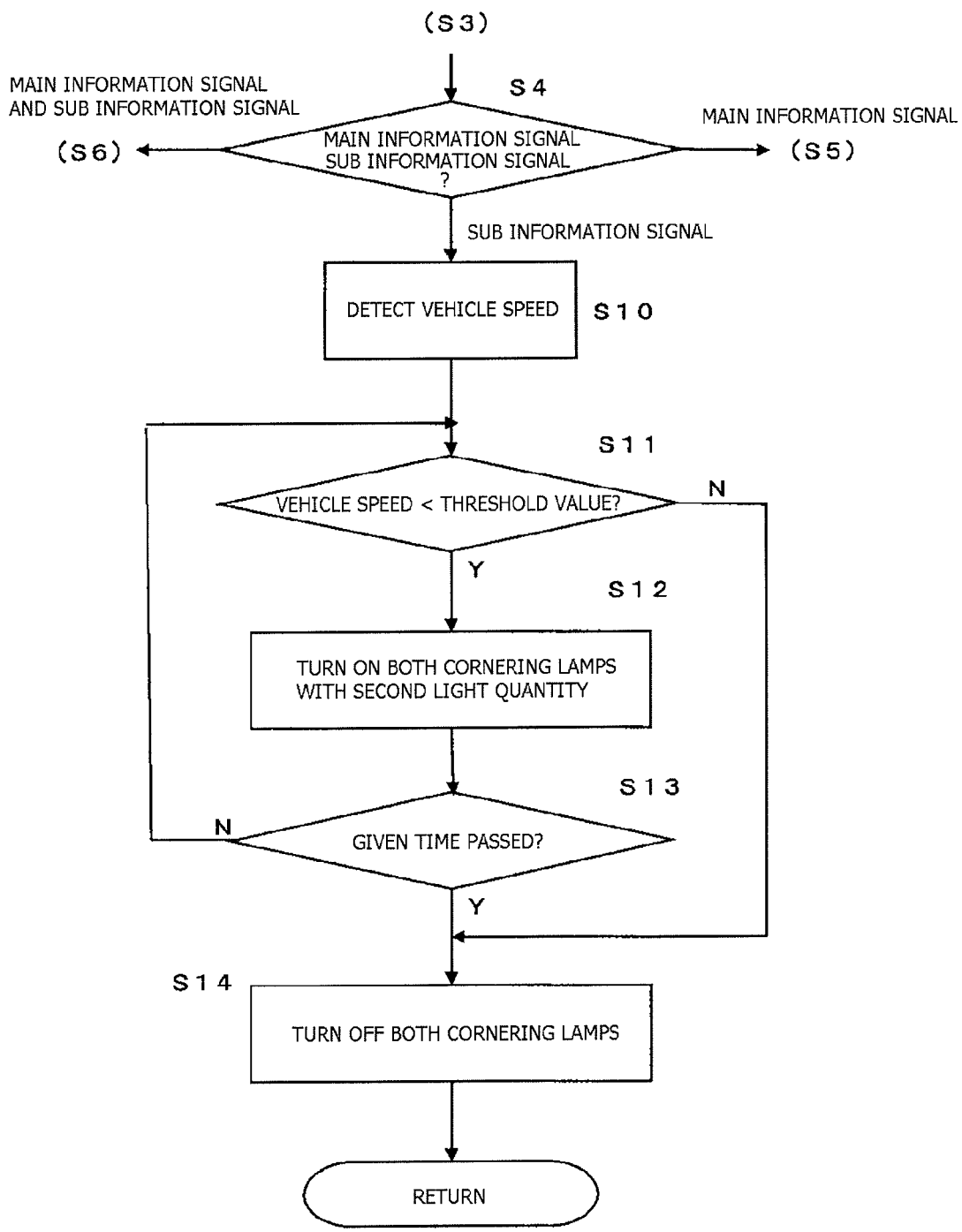
FIG. 7 is a flow chart of a lamp control operation according to a vehicle speed signal.

Further, the embodiment 1 is effective even to a lightly equipped vehicle excluding an imaging camera CAM for outputting the face direction detection signal and a navigation apparatus NAV for outputting the road condition signal, while the sub information signal may be constituted only by the vehicle speed signal in such lightly equipped vehicle can only output. In the flow chart of FIG. 7, the information signal determination part 1 determines in Step S4 that only the sub information signal is input (S4), and then the vehicle speed is detected from the input sub information signal (S10). The lamp control unit ECU compares the vehicle speed obtained from the vehicle speed signal with a previously set vehicle speed threshold value SLv (S11). When the vehicle speed is below the vehicle speed threshold value SLv, the left and right cornering lamps LCL and RCL are turned on with the second light quantity (S12). The reason for this is that, when own vehicle approaches the intersection, the driver decelerates own vehicle and thus the vehicle speed is caused to go below the vehicle speed threshold value SLv. Also, since the lamp control in this case is based on the sub information signal, as shown in FIG. 6B, of course, the light quantity of the left and right cornering lamps LCL and RCL is the light quantity which is 50% of the normal light quantity.

In this manner, since the intersection is estimated from the vehicle speed to thereby turn on the left and right cornering lamps LCL and RCL simultaneously, in the intersection, pedestrians and bicycles existing on the left and right of own vehicle can be confirmed to thereby secure their safety. Also, since the light quantity in this case is the second radiation quantity (low light quantity), the pedestrians and bicycles can be prevented from misunderstanding the traveling direction of the vehicle. After the left and right cornering lamps LCL and RCL are turned on in this manner, when the vehicle speed does not become equal to the vehicle speed threshold value or more, the turn-on of the lamps is allowed to continue until passage of a given time ts previously set by the time keeping of the built-in timer (S13). However, after passage of the given time, the two cornering lamps LCL and RCL are caused to turn off (S14). Specifically, since the reason why the vehicle speed does not become again equal to the vehicle speed threshold value or more is assumed that own vehicle is stopping or is running slowly due to a traffic jam, the two lamps are caused to turn off for power saving.

Figure 8:
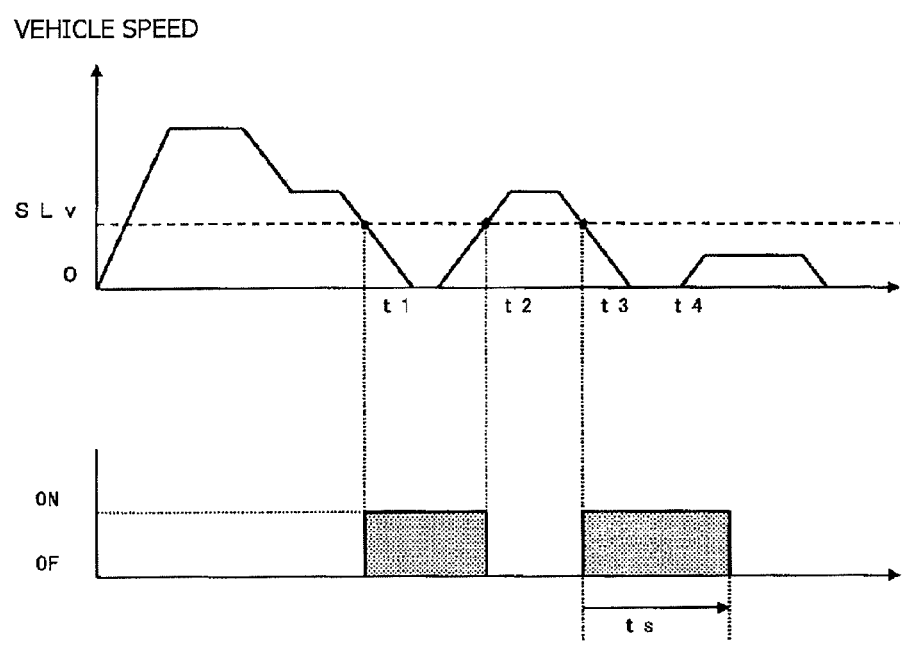
FIG. 8 is a timing chart of lamp control according to the vehicle speed signal.

FIGS. 8A and 8B show an example of variations in the vehicle speed and the turn-on conditions of the left and right cornering lamps LCL and RCL, in which, when the vehicle is decelerated and the vehicle speed goes below the vehicle speed threshold value SLv, the left and right cornering lamps LCL and RCL are turned on with the second light quantity. Also, when, after the left and right cornering lamps LCL and RCL are turned on, the vehicle speed does not become the vehicle speed threshold value SLv or more, the two lamps are kept on until a given time ts passes but, after passage of the given time ts, they are turned off. This given time is set for the time sufficient for the vehicle to pass the intersection at its normal running speed. Here, the turn-off of the left and right cornering lamps LCL and RCL may also be carried out when the operation of a parking brake in own vehicle is detected or when the execution of the operation to cut the engine is detected.

In the lamp control based on the vehicle speed, acceleration or deceleration may also be operated from variations in the vehicle speed of the input vehicle speed signal and, by referring to such acceleration or deceleration, the accuracy of the estimation for own vehicle to run into the intersection may be enhanced. For example, in the case that, when the vehicle speed goes below the vehicle speed threshold value and the deceleration exceeds the deceleration threshold value, the vehicle is estimated to have run into the intersection, the accuracy of such estimation can be enhanced.

Here, of course, when the main information signal is input to the lamp control unit ECU simultaneously with the vehicle speed signal, the left and right cornering lamps LCL and RCL are turned on, while the left or right cornering lamp LCL or RCL existing on the traveling direction side is turned on with the first light quantity (normal light quantity) and the other RCL or LCL existing on the opposite side to the traveling direction is turned on with the second light quantity (small light quantity). Thus, an area ahead of own vehicle and its traveling direction can be illuminated brightly with the first light quantity to thereby secure the safety, while other vehicles and pedestrians can be prevented from misunderstanding the direction to which own vehicle changes its traveling direction.

In the above embodiment 1, in the case that the first light quantity used to turn on the left and right cornering lamps according to the main information signal is defined as 100%, the second light quantity used to turn on the cornering lamps according to the sub information signal is defined as 50% of the first light quantity. However, the reduction light quantity in the second light quantity is arbitrary, for example, the second light quantity may also be set properly in the range of 30~70% of the first light quantity. Or, the reduction light quantity may be varied according to a difference between environments where own vehicle runs, for example, a difference between a town and a suburb. Specifically, in the town, the second light quantity may be about 30% and, in the suburb, about 70%. Such environmental difference may be obtained from, for example, road information provided from the navigation apparatus or from information on the image of an area ahead of own vehicle picked up by an onboard camera carried on own vehicle. Further, the second light quantity may also be varied according to variations in the brightness of the periphery of own vehicle, weather, vehicle speed and the like. Especially, in the case that the accuracy of the estimation of an intersection according to vehicle speed variations is high, the second light quantity may be increased up to about 70%. However, of course the light quantity must be a quantity which can prevent other vehicles and pedestrians from misunderstanding the direction to which own vehicle changes its traveling direction.

EMBODIMENT 2

Figure 9:
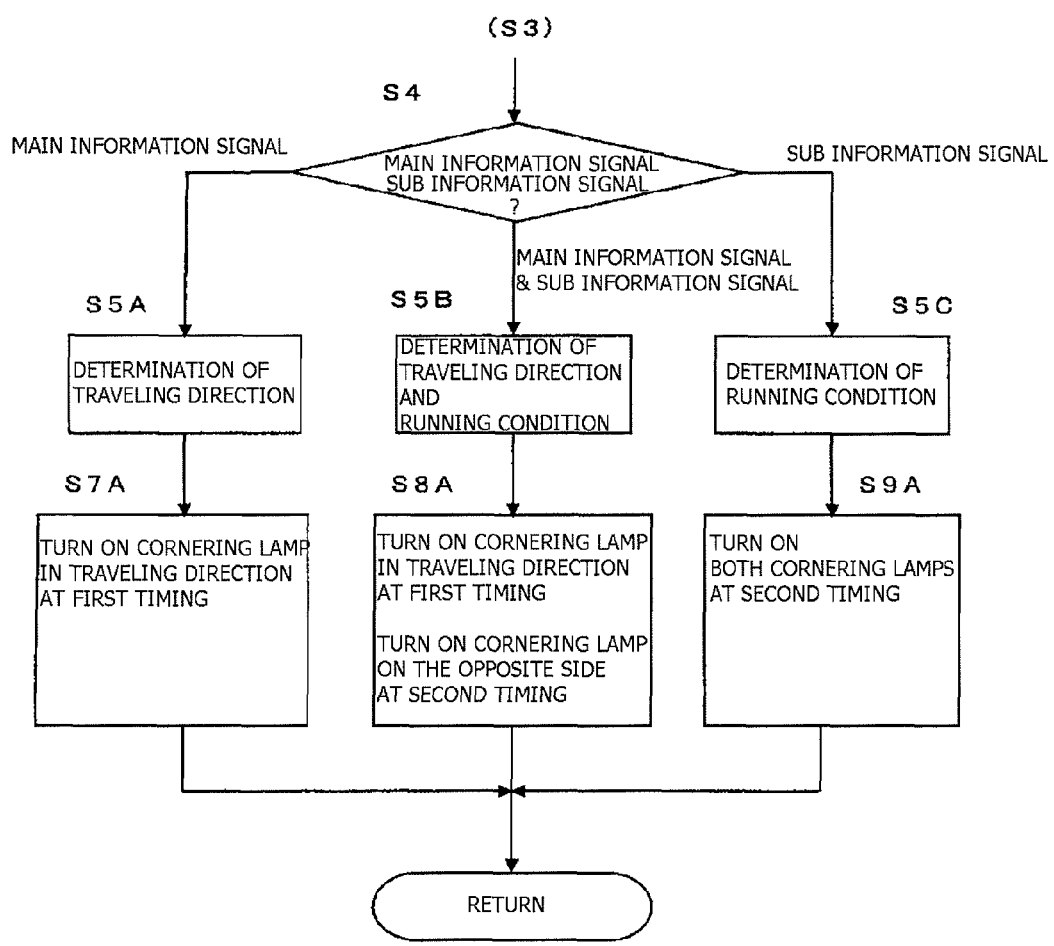
FIG. 9 is a flow chart of a lamp control operation of an embodiment 2.

FIG. 9 is a flow chart of a lamp control according to an Embodiment 2. According to the Embodiment 2, as the first control and the second control, a turning-on timing is controlled. As described in the above, the turning-on timing may include the duration from the start of turning on of the sub lamps (that is, the cornering lamps) to reach the predetermined light quantities or the duration from the start of turning off of the lamps to reach the complete lighting-off. Here, as described in the below, the turning-on timing is defined as the duration to reach the predetermined light quantity in which the light quantity of a corresponding lamp is gradually increased depending on a passage of time. The timing may be called as the time constant. Further, regarding steps S1 to S3 of the Embodiment 2 which are the similar to the steps S1 to S3 of the Embodiment 1, descriptions based on drawings are omitted.

Figure 10A:
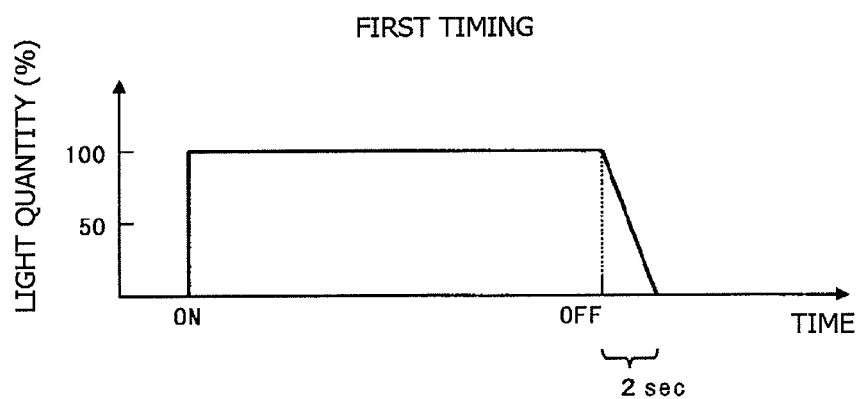
FIG. 10A is a timing chart of a first condition (first timing).

In step 4, the information signal determination part 1 determines the input information signal. When it is determined that only the main information signal is input, the traveling direction/running condition determination part 2 determines the traveling direction of the own vehicle based on the main information signal (S5A). After the traveling direction id determined, the light quantity control section 41 of the sub lamp control part 4 turns on one of cornering lamps LCL and RCL at a side of the determined traveling direction in the first timing (S7A). For example, when the main information signal is given from the turn signal lamp switch SWT and is found to change the own vehicle traveling direction to the left, as shown in FIG. 6A, there is obtained the light distribution pattern Pcl according to which the left cornering lamp LCL has been turned on. At this occasion, as shown in FIG. 10A, the corresponding cornering lamp is turned on with the first timing such that the light quantity of the lamp reaches to the predetermined light quantity immediately (substantially zero second) after an ON operation of the turn signal lamp switch SWT. Since the left cornering lamp LCL at the side of the traveling direction of the own vehicle is immediately turned on with the predetermined light quantity, the area ahead of the own vehicle and the left area existing in the vehicle traveling direction can be rapidly illuminated with the predetermined light quantity, thereby being able to secure the safety in the running of the own vehicle. Of course, when changing the traveling direction to the right, the right cornering lamp RCL may be similarly turned on with the first timing immediately, thereby being able to rapidly secure the safety in the right area.

Further, in Step S4, when the information signal determination part 1 determines that the main and sub information signals are both input, based on the determination of the traveling direction by the traveling direction/running condition determination part 2 (S5B), the timing control section 42 turns on the cornering lamp at the side of the traveling direction with the first timing. At the same time, based on a determination of the running condition according to the input sub information signal, the cornering lamp at the opposite side of the traveling direction is turned on with the second timing (S8A). According to an example of FIG. 6C, the left cornering lamp LCL is turned on with the first timing, and the right cornering lamp RCL is turned on with the second timing. As shown in FIG. 10, a control of the second timing is a redundant turning-on control, in which the light quantity of the lamp does not reach to the predetermined light quantity immediately after a start of the turning-on, the light quantity is gradually increased while spending a longer time compared with the first timing, and then the light quantity reaches to the predetermined light quantity after a preset time (for example, 1 second).

Thus, by immediately turning-on the left cornering lamp LCL at the side of the traveling direction with the predetermined light quantity at the first timing, it is possible to rapidly illuminate the area ahead of the own vehicle and the left area existing in the vehicle traveling direction with the predetermined light quantity, thereby being able to secure the safety in the running of the own vehicle. In addition, since the right cornering lamp RCL at the opposite side of the traveling direction is turned on at the second timing, the safety of the area in the opposite side of the traveling direction can be secured. In addition, since an increase of the light quantity of the right cornering lamp RCL in the opposite side is redundant and the noticeability of the lamp is lower than the case that the lamp is turned on at the first timing in which the light quantity is immediately increased, even when other vehicles and pedestrians watch the turn-on of the cornering lamp, there is little possibility that they misunderstand that the own vehicle will change its traveling direction to the opposite side and/or take a wrong reaction against their safety.

In the step 4, when it is determined that the input signal is sub information signal, the traveling direction/running condition determination part 2 determines the running condition (S5C) and does not perform a determination of the traveling direction. In this occasion, the timing control section 42 of the sub lamp control part 4 respectively turns on both of the left and right cornering lamps LCL and RCL at the second timing (S9A). When the left and right cornering lamps LCL and RCL are turned on at the second timing, since the noticeability of these cornering lamps is lowered, even when other vehicles and pedestrians watch the turn-on of the cornering lamp, there is little possibility that they misunderstand that the own vehicle will change its traveling direction to left or right side and/or take a wrong reaction against their safety. In addition, according to this turning-on timing control, as shown in FIG. 6B, the driver of the own vehicle does not feel strange even by turning on the left and right cornering lamps LCL and RCL, and the driver can perform the right/left confirming action.

Even in the Embodiment 2, even if the steering operation or the turn indicating operation by the driver is delayed when the driver would change the traveling direction of the own vehicle to left, by detecting the right/left confirmation action of the driver based on the face direction detection signal of the sub information signal in advance and by turning on the left and right cornering lamps LCL and RCL at the second timing, the light quantity of the both cornering lamps are gradually increased and the driver can perform the right/left confirming action. In this occasion, even when other vehicles and pedestrians watch the turn-on of the cornering lamps, there is little possibility that they misunderstand that the own vehicle will change its traveling direction to left or right side and/or take a wrong reaction against their safety. Then, by turning on the left cornering lamp LCL at the side of the traveling direction to be the predetermined radiating light quantity at the first timing in response to the main information signal such as the turn signal by the turn indicating operation or the steering angle signal by the steering operation, the area in the traveling direction can be rapidly and brightly illuminated and the safety in the left side can be secured.

Figure 10B:
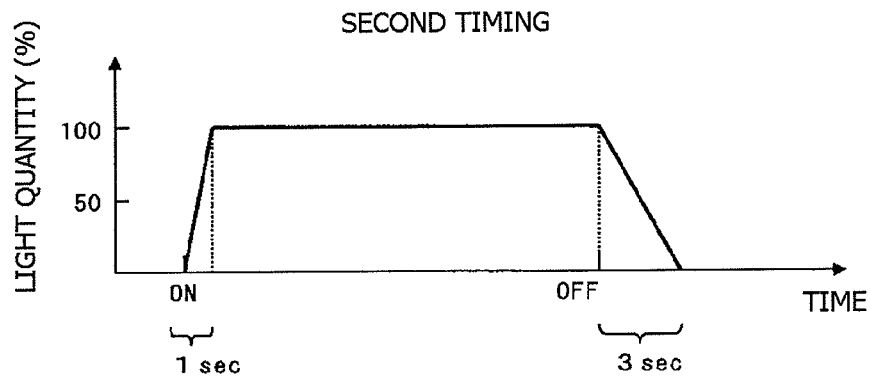
FIG. 10B is a timing chart of a second condition (second timing).

Regarding the first timing and the second timing of the Embodiment 2, timings (time constant) at a time of the turning-off may be differed from each other. For example, as shown in FIGS. 10A and 10B, a duration till a corresponding lamp is completely lighting-off (lighting-off time) may be set as 3 seconds in the second timing so that it is longer than a lighting-off time of the first timing which may be set as 2 second. By setting the lighting-off time shorter on the cornering lamp at the side of the traveling direction, the noticeability of the corresponding lamp due to the turning off thereof is improved (that is, attention degrees of the other vehicles and pedestrians to the turning-off of the lamp at the traveling side are increased, and attention degree of the other vehicle and pedestrians to the turning-off of the lamp at the opposite side are decreased), so as to prevent the other vehicle and the pedestrians from misunderstanding that the own vehicle will change its traveling direction to the opposite side and/or from taking a wrong reaction against their safety.

EMBODIMENT 3

Figure 11:
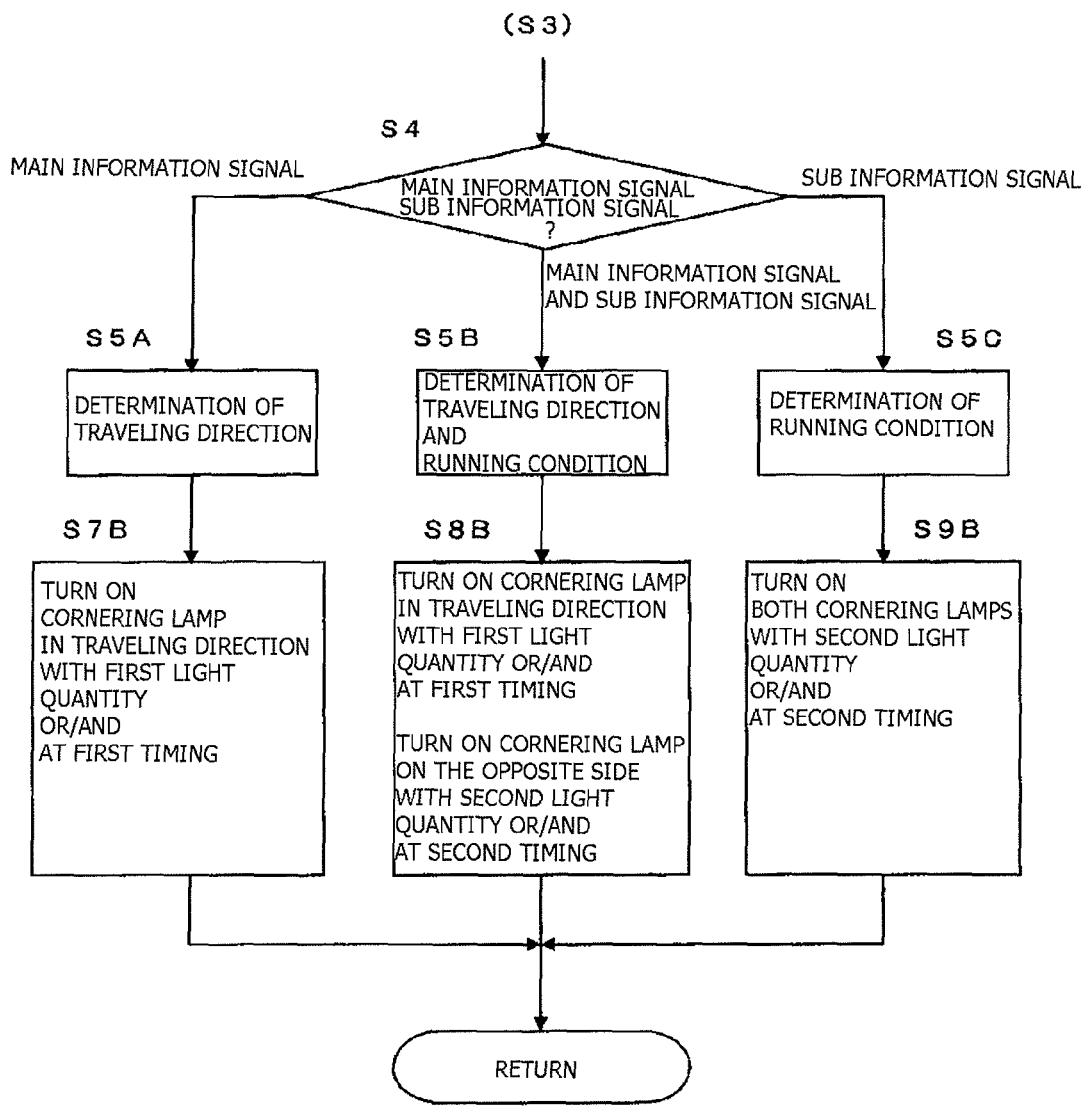
FIG. 11 is a flow chart of a lamp control operation of an embodiment 3.

FIG. 11 is a flow chart of a lamp control according to an Embodiment 3. According to the Embodiment 3, as the control of the sub lamps in the first condition and the second condition, a combination of the light quantity control in the Embodiment 1 and the turning-on timing control in the Embodiment 2 is performed. Further, regarding steps S1 to S3 of the Embodiment 3 which are the similar to the steps S1 to S3 of the Embodiment 1, descriptions based on drawings are omitted.

Figure 12A:
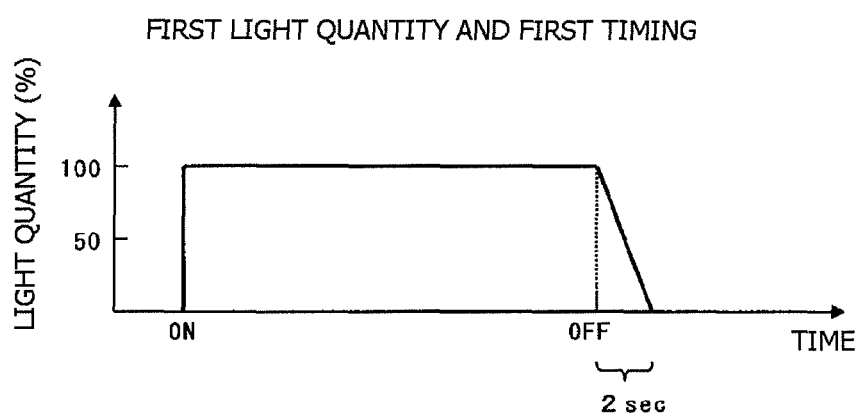
FIG. 12A is a timing chart of a first condition (first light quantity or/and first timing).
Figure 12B:
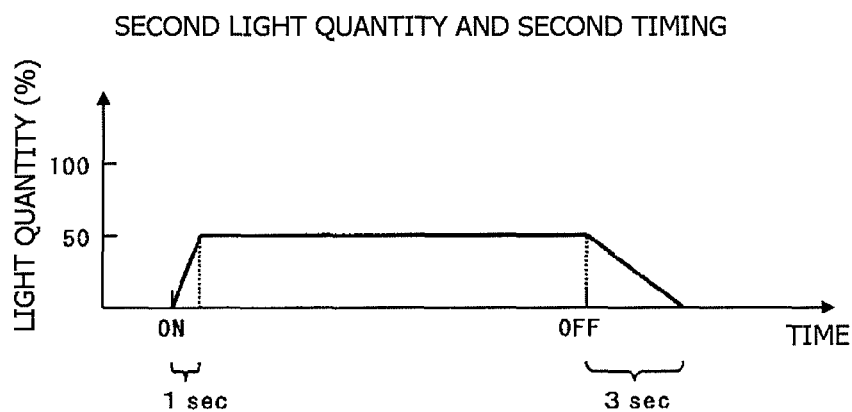
FIG. 12B is a timing chart of a second condition (second light quantity or/and second timing).

Although detailed explanations of Embodiment 3 are omitted since the Embodiment 3 is the combination of the Embodiment 1 and the Embodiment 2, the traveling direction is determined when the main information signal is input (S5A), and then either of left or right left and right cornering lamp LCL or RCL at the side of the determined traveling direction is controlled to be turned on with the first light quantity and at the first timing, as shown in FIG. 12A. Alternatively, the corresponding lamp may be turned on with the first light quantity or at the first timing (S7B).

When both of the main information signal and the sub information signal are input, the traveling direction is determined based on the main information signal (S5B), and then the cornering lamp at the side of the determined traveling direction is turned on with the first light quantity and at the first timing. Alternatively, the corresponding lamp may be turned on with the first light quantity or at the first timing. In addition, the cornering lamp at the opposite side of the traveling direction is turned on with the second condition, that is, with the second light quantity and at the second timing. Alternatively, the corresponding lamp may be turned on with the second light quantity or at the second timing (S8B).

When the input information signal is the sub information signal, the running condition is determined (S5C), and then the left and right cornering lamps LCL and RCL are turned on at the second condition, that is, with the second light quantity and at the second timing. Alternatively, the left and right cornering lamps LCL and RCL are turned on with the second light quantity or at the second timing. (S9B)

As described in the above, according to the Embodiment 3, by combining the light quantity control of the Embodiment 1 and the turning-on timing of the Embodiment 2, the noticeability in turning-on of the left and right cornering lamps LCL and RCL, that is, the attention degree of the other vehicles and the pedestrians to the cornering lamps, can be varied, so that the turning-on control in a preferable condition can be realized. In the lamp control unit ECU, either of the first and second light quantities or the first and second timings may be arbitrarily selected or a combination there of may be set. For example, a circumference environment in which the own vehicle is running is determined based on the sub information signal such as the vehicle speed detected by the vehicle speed sensor, the road information detected by the navigation device or the like, and the light quantity control or the turning-on timing control may be selected or the both may be used based on the determined circumference environment.

Although the headlamps and the cornering lamps are exemplified as the main lamps and the sub lamps in the above description of the Embodiments 1 to 3, the main lamps and sub lamps of the invention are not limited thereto.

That is, the main lamp may be any lamp, provided that it can illuminate the straight running direction of own vehicle, while the sub lamp may be any lamp, provided that it can illuminate the lateral sides of own vehicle. In addition, any lamp that can change its light quantity may be applied to the sub lamp of the Embodiment 1 or 3, and any lamp that can change the turning-on timing may be applied to the sub lamp of the Embodiment 2 or 3. Also, the sub lamps are not limited to any specific kinds of lamps, that is, they may be any one of a discharge lamp, an incandescent lamp, a light emitting element lamp and the like.

In accordance with the above described embodiments, a vehicle lamp control apparatus in which sub lamps (RCL, LCL) provided on right and left sides of a vehicle (CAR) are controlled in accordance with running states of the vehicle (CAR) may include a control unit (ECU) adapted to control the sub lamps (RCL, LCL) in a first condition based on a main information signal including a turn signal or a steering angle signal, and to control the sub lamps (RCL, LCL) in a second condition a noticeability of which is lower than a noticeability of the first condition based on a sub information signal other than the main information signal.

In the above structure, the control unit (ECU) may be adapted to turn on the sub lamps (RCL, LCL) with a first light quantity in the first condition, and to turn on the sub lamps (RCL, LCL) with a second light quantity which is smaller than the first light quantity in the second condition.

In the above structure, the control unit (ECU) may be adapted to turn on the sub lamps (RCL, LCL) at a first timing (may be referred as "time constant" in the above description) in the first condition, and to turn on the sub lamps (RCL, LCL) at a second timing which is more redundant than the first timing in the second condition.

In the above structure, the control unit may be adapted to turn on the sub lamps (RCL, LCL) at a first timing or with a first light quantity in the first condition, and to be turn on the sub lamps (RCL, LCL) at a second timing which is more redundant than the first timing or with a second light quantity which is smaller than the first light quantity in the second condition.

In the above structure, the control unit may be adapted to turn on one of the sub lamps (RCL, LCL) existing on a side of a traveling direction of the vehicle determined based on the main information signal in the first condition, in a situation that the main information signal is input.

In the above structure, the control unit may be adapted to turn on one of the sub lamps (RCL, LCL) existing on a side of a traveling direction of the vehicle determined based on the main information signal in the first condition, and to turn on the other of the sub lamps (RCL, LCL) in the second condition, in a situation that the main information signal and sub information signal are input.

In the above structure, the control unit may be adapted to turn on both of sub lamps (RCL, LCL) in the second condition in a situation that the sub information signal is input.

According to the apparatus of the above described embodiments, since a sub lamp existing in a traveling direction is turned on with a first condition which has a high noticeability (that is, a high visibility to an other vehicle's driver and a pedestrian) when the sub lamps are controlled based on a high-accuracy main information signal such as a turn signal and/or a steering angle signal for determining a traveling direction of an own vehicle, the traveling direction of own vehicle can be illuminated brightly, thereby being able to secure safety in the running of own vehicle. Also, when the sub lamps are controlled based on a low-accuracy sub information signal for estimating the traveling direction of own vehicle, since both sub lamps are respectively turned on with a second condition which has a noticeability lower than the noticeability of the first condition (that is, a visibility of the second condition is lower than the visibility of the first condition), not only the safety of the own vehicle can be secured without causing the driver of the own vehicle to feel strange but also other vehicles and pedestrians can be prevented against unnecessary confusion, for example, they can be prevented from misunderstanding the movement of own vehicle and taking wrong actions, thereby being able to secure the safety of them.

The apparatus of the embodiments can be employed in a lamp control apparatus for use in a vehicle including sub lamps respectively provided on the left and right of the vehicle for illuminating the lateral areas of the vehicle.

What is claimed is:

1. A vehicle lamp control apparatus in which sub lamps provided on right and left sides of a vehicle are controlled in accordance with running states of the vehicle, the apparatus comprising:
a control unit adapted to control the sub lamps in a first condition based on a main information signal including a turn signal or a steering angle signal, and to control the sub lamps in a second condition based on a sub information signal other than the main information signal, wherein a noticeability of the second condition is lower than a noticeability of the first condition.

2. The apparatus according to claim 1, wherein the control unit is adapted to turn on the sub lamps with a first light quantity in the first condition, and to turn on the sub lamps with a second light quantity which is smaller than the first light quantity in the second condition.

3. The apparatus according to claim 1, wherein the control unit is adapted to turn on the sub lamps at a first timing in the first condition, and to turn on the sub lamps at a second timing which is more redundant than the first timing in the second condition.

4. The apparatus according to claim 1, wherein the control unit is adapted to turn on the sub lamps at a first timing or with a first light quantity in the first condition, and to be turn on the sub lamps at a second timing which is more redundant than the first timing or with a second light quantity which is smaller than the first light quantity in the second condition.

5. The apparatus according to claim 1, wherein the control unit is adapted to turn on one of the sub lamps existing on a side of a traveling direction of the vehicle determined based on the main information signal in the first condition, in a situation that the main information signal is input.

6. The apparatus according to claim 1, wherein the control unit is adapted to turn on one of the sub lamps existing on a side of a traveling direction of the vehicle determined based on the main information signal in the first condition, and to turn on the other of the sub lamps in the second condition, in a situation that the main information signal and sub information signal are input.

7. The apparatus according to claim 1, wherein the control unit is adapted to turn on both of sub lamps in the second condition in a situation that the sub information signal is input.

* * * * *